(12) United States Patent
Winkler et al.

(10) Patent No.: US 9,814,290 B1
(45) Date of Patent: Nov. 14, 2017

(54) NOVELTY BAG

(71) Applicants: Brittany Winkler, San Antonio, TX (US); Jon Kiev, Vernon Hills, IL (US)

(72) Inventors: Brittany Winkler, San Antonio, TX (US); Jon Kiev, Vernon Hills, IL (US)

( * ) Notice: Subject to any disclaimer, the term of this patent is extended or adjusted under 35 U.S.C. 154(b) by 0 days.

(21) Appl. No.: 15/182,599

(22) Filed: Jun. 15, 2016

(51) Int. Cl.
```
A45C 15/06      (2006.01)
A45C 13/26      (2006.01)
F21V 23/04      (2006.01)
H05B 37/02      (2006.01)
```

(52) U.S. Cl.
CPC ............ *A45C 15/06* (2013.01); *A45C 13/26* (2013.01); *F21V 23/0414* (2013.01); *H05B 37/0281* (2013.01)

(58) Field of Classification Search
CPC ..... A45C 15/06; A45C 13/26; F21V 23/0414; H05B 37/0281
See application file for complete search history.

(56) References Cited

U.S. PATENT DOCUMENTS

| | | | |
|---|---|---|---|
| 6,059,423 A | 5/2000 | Knopick | |
| 6,200,000 B1 | 3/2001 | Burnidge | |
| 6,267,485 B1 | 7/2001 | Rodgers | |
| 6,454,432 B1 | 9/2002 | Avinger et al. | |
| 6,789,932 B2 | 9/2004 | Healy | |
| 7,147,342 B2 | 12/2006 | Burnidge | |
| 7,311,415 B1 | 12/2007 | Burnidge | |
| 8,147,086 B2 | 4/2012 | Tait | |
| 9,022,595 B1 | 5/2015 | Schilling | |
| 2003/0189318 A1 | 10/2003 | Clark | |
| 2007/0109772 A1 | 5/2007 | Chang | |
| 2007/0133195 A1 | 6/2007 | Gorton | |
| 2009/0314677 A1 | 12/2009 | Teggatz et al. | |
| 2010/0128588 A1 | 5/2010 | Shuman | |
| 2013/0201666 A1* | 8/2013 | Melamed | A45C 3/08 362/156 |
| 2013/0250603 A1 | 9/2013 | Begriche et al. | |
| 2015/0327647 A1 | 11/2015 | Wiklacz | |
| 2016/0010844 A1 | 1/2016 | Ma | |
| 2017/0105500 A1* | 4/2017 | Gildon | A45C 15/06 |

* cited by examiner

*Primary Examiner* — Thomas M Sember
(74) *Attorney, Agent, or Firm* — Evan D. Linderman (57) ABSTRACT

In one embodiment of the invention, a novelty bag is provided that includes at least one panel connected to a bottom panel, and least one handle connected to the panel. There is at least one orifice in the at least one panel, and the orifice is adapted to receive a lighting element. A pouch is also connected to the panel, and a light module and a sound module are disposed within the pouch. The pouch includes at least one slit adapted to allow sound to travel through the pouch. An activation mechanism is disposed within the at least one handle, and the activation mechanism is in electrical communication with the light module and the sound module.

18 Claims, 5 Drawing Sheets

NOVELTY BAG

TECHNICAL FIELD

The present invention relates to devices to store items. More particularly, it relates to novelty bags.

BACKGROUND

Embodiments of the invention relate to novelty bags that emit light and sound.

Novelty bags that emit light and sound can provide fun and enjoyment for the recipient of the bag, and they can provide safety as well.

Halloween is a very popular holiday during which children of all ages walk around neighborhoods carrying trick-or-treat bags and gather candy from homes in neighborhoods. Often, Halloween falls on a weekday, meaning many children may be out trick-or-treating after sunset. In such cases, it can be beneficial to provide a child with a trick-or-treat bag that emits light and/or sound to alert cars of the presence of the child. It is also important to conserve battery life so the light and/or sound emission can continue for the duration of the trick-or-treating session.

Some products have attempted to address this issue by providing a bag with a user-activated light, but oftentimes the user forgets to turn off the light when it is not needed, and the battery fails prematurely.

Other products include bags that incorporate light or sound, but not both, so the combined benefit of emitting light and sound at the same time is not realized.

Yet other products include ways to activate light or sound that require the use of two hands, which is inconvenient for the user.

Previous devices do not present a solution wherein a novelty bag emits light and sound for a predetermined amount of time upon pressing a button or switch on the handle of the bag. What is needed in the market is a novelty bag that emits light and sound for a predetermined amount of time upon pressing a button or switch on the handle of the bag.

BRIEF SUMMARY OF THE INVENTION

In one embodiment of the invention, a novelty bag is provided that includes at least one panel connected to a bottom panel, and least one handle connected to the panel. There is at least one orifice in the at least one panel, and the orifice is adapted to receive a lighting element. A pouch is also connected to the panel, and a light module and a sound module are disposed within the pouch. The pouch includes at least one slit adapted to allow sound to travel through the pouch. An activation mechanism is disposed within the at least one handle, and the activation mechanism is in electrical communication with the light module and the sound module.

In another embodiment of the invention, a novelty bag is provided that includes at least one panel connected to a bottom panel, and least one handle connected to the panel. There is at least one orifice in the at least one panel, and the orifice is adapted to receive a lighting element. A pouch is also connected to the bottom panel, and a light module and a sound module are disposed within the pouch. The pouch includes at least one slit adapted to allow sound to travel through the pouch. An activation mechanism is disposed within the at least one handle, and the activation mechanism is in electrical communication with the light module and the sound module.

BRIEF SUMMARY OF THE DRAWINGS

The accompanying drawings, which are incorporated in and form a part of the specification, illustrate example embodiments and, together with the description, serve to explain the principles of the invention. In the drawings.

DETAILED DESCRIPTION

Figure 1A:
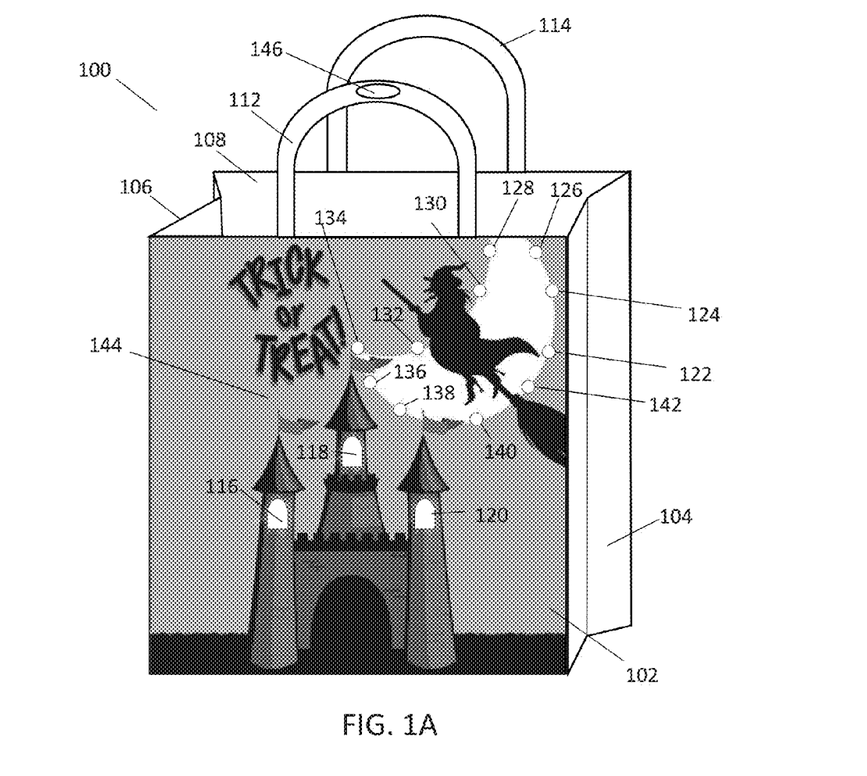
FIGS. 1A-1B illustrate a novelty bag in accordance with aspects of the present invention.
Figure 1B:
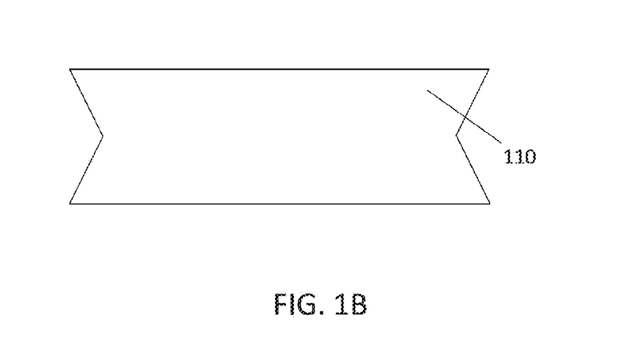

FIG. 1 illustrates a novelty bag in accordance with aspects of the present invention.

As shown in the figure, a novelty bag 100 includes a front panel 102, a side panel 104, a side panel 106, a back panel 108, a bottom panel 110 (not shown), a handle 112, and a handle 114.

Front panel 102, side panel 104, side panel 106, back panel 108, and bottom panel 110 may be constructed from any material typically used to create a novelty bag. Non-limiting examples of materials that may be used include paper, fabric, polyethylene, polypropylene, and other plastic or woven materials.

To create the structure of novelty bag 100, front panel 102 and back panel 108 may be attached to side panel 104 and side panel 106 by any conventional means used in creating bags. As non-limiting examples, the attachments may be achieved by using stitching, adhesives, or tape. Front panel 102, back panel 108, side panel 104, and side panel 106 may also be attached to bottom panel 110 by stitching, adhesives, or tape.

In this example, front panel 102, back panel 108, side panel 104, side panel 106, and bottom panel 110 are shown as separate components. However, in other embodiments, front panel 102, back panel 108, side panel 104, side panel 106, and bottom panel 110 may be constructed from a single component or piece of material. In yet other embodiments, at least two of front panel 102, back panel 108, side panel 104, side panel 106, and bottom panel 110 may be constructed from a single component or piece of material.

In addition, in this example novelty bag 100 is shown as having a generally rectangular shape. However, in other embodiments novelty bag 100 may be a different shape. Non-limiting examples of shapes include circular, triangular, ellipsoid, or any other shape that can be used as a novelty bag.

Front panel 102 further includes a novelty design 144, and a plurality of orifices with each orifice individually numbered 116-142.

Novelty design 144 may be any type of artistic design related to the preferences of the manufacturer. As shown in the figure, novelty design 144 has a Halloween theme, however any other type of artistic design may be used. Non-limiting examples of other types of artistic designs include those related to Christmas, Easter, New Year's Eve, birthdays, and anniversaries.

Orifices 116-142 are adapted to receive lighting elements from inside novelty bag 100 and to allow lighting elements to be removably connected to orifices 116-142. To provide for a removable connected to lighting elements, orifices 116-142 may include a threaded connection, a snap fit connection, a bayonet connection, or any other type of connection that would allow a lighting element to be removably connected to an orifice.

Handles 112 and 114 may be constructed from any material typically used to create a handle for a novelty bag. Non-limiting examples of materials that may be used include paper, fabric, polyethylene, polypropylene, and other plastic or woven materials. Handles 112 and 114 are preferably flexible and include at least one internal channel through which a wire may extend to create electrical connections. Handles 112 and 114 are connected to front panel 102 and back panel 108, respectively, by any typical attachment means used to attach handles to a bag. Non-limiting examples of attachments include stitching, adhesives, and tape.

Figure 5A:
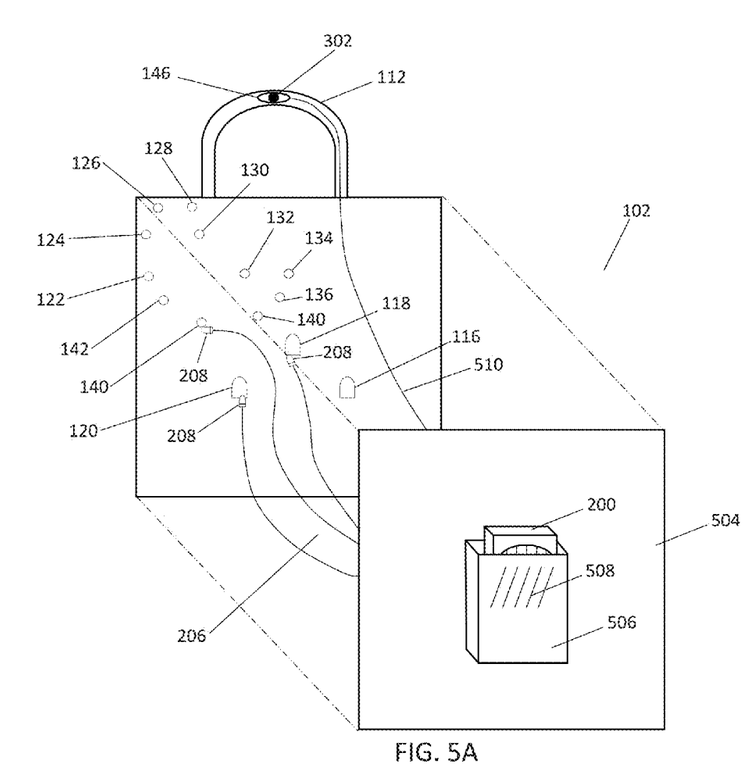
FIG. 5A illustrates an exploded view of a panel of a novelty bag in accordance with aspects of the present invention.

Handle 112 further includes an orifice 146. Orifice 146 extends through a wall of handle 112 to the internal channel. Handle 112 will be further described with reference to FIG. 5.

Figure 2:
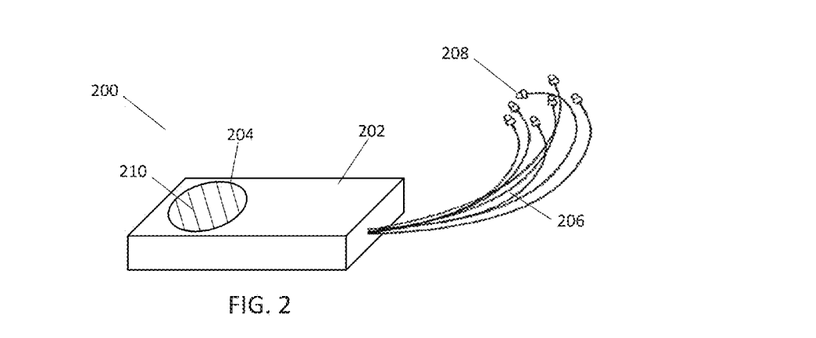
FIG. 2 illustrates a control module in accordance with aspects of the present invention.

FIG. 2 illustrates a control module in accordance with aspects of the present invention.

As shown in the figure, control module 200 includes a housing 202, an opening 204, a plurality of lighting element wires 206, and a plurality of lighting elements 208.

Housing 202 encloses components that control the operation of light and sound. The components will be further described with reference to FIGS. 3-4. Housing 202 may be constructed from any material strong enough and durable enough to enclose and protect various components. Non-limiting examples of components protected by housing 202 include electrical components, computer components, and wireless networking components.

Opening 204 extends through housing 202, and provides a path through which sound may pass. Opening 204 may include a retaining structure 210 to provide assurance that no components contained within housing 202 inadvertently fall out of opening 204. Retaining structure 210 may include a fabric or metal mesh, or any other type of structure that provides many smaller orifices through which sound may travel.

The plurality of lighting element wires 206 extends from inside housing 202 to connect to the plurality of lighting elements 208. Lighting element wires 206 may include any type of wiring that electrically connects lighting elements 208 to a light module inside housing 202. Lighting elements 208 may include any type of lighting elements that can provide illumination on a novelty bag. Non-limiting examples of lighting elements include LED bulbs, incandescent bulbs, fluorescent bulbs, and neon bulbs. Lighting elements 208 may draw power from a power source contained within control module 200; however, lighting elements 208 may also draw power from an internal power source. As a non-limiting example, each lighting element within lighting elements 208 may include a battery from which it draws power.

Figure 3:
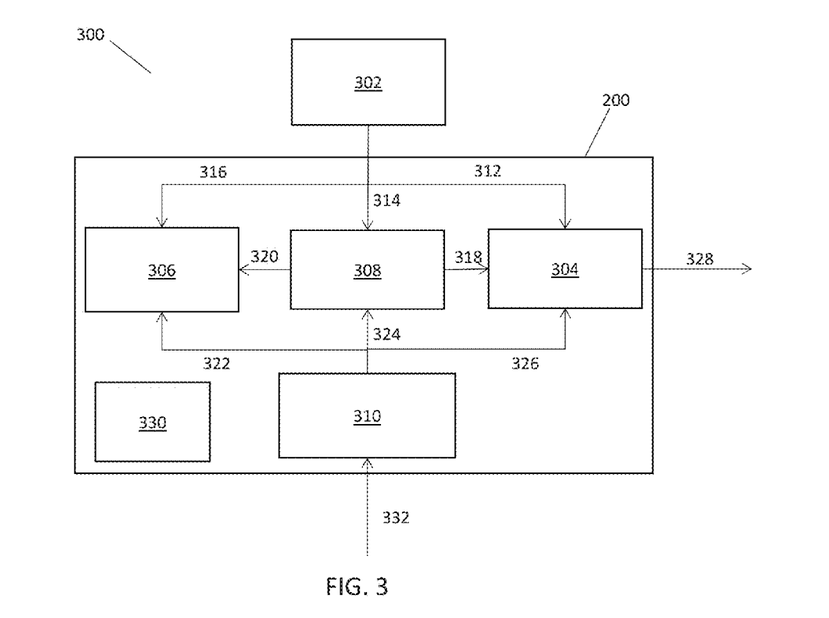
FIG. 3 illustrates a block diagram of a control module in accordance with aspects of the present invention.

FIG. 3 illustrates a block diagram of a control module in accordance with aspects of the present invention.

As shown in the figure, a control system 300 includes an activation element 302 and control module 200. Control module 200 further includes a light module 304, a sound module 306, a timing element 308, a programming module 310, and a power source 330.

In this example embodiment, light module 304, sound module 306, timing element 308, programming module 310, and power source 330 are shown as independent components. However, in some embodiments, at least two of light module 304, sound module 306, timing element 308, programming module 310, and power source 330 may be combined as a unitary device. Further, in some embodiments, at least one of light module 304, sound module 306, timing element 308, and programming module 310 may be implemented as a computer having tangible computer-readable media for carrying or having computer-executable instructions or data structures stored thereon. Such tangible computer-readable media can be any available media that can be accessed by a general purpose or special purpose computer. Non-limiting examples of tangible computer-readable media include physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Activation element 302 is connected to and protrudes from orifice 146 of handle 112 from FIG. 1, and activation element 302 communicates with light module 304 via communication channel 312, with timing element 308 via communication channel 314, and with sound module 306 via communication channel 316. Activation element 302 may be any type of device that can electrically activate a component. Non-limiting examples of activation elements include rocker switches, sliding switches, and pushbuttons. Communication channels 312-316 may include wired or wireless connections. For a wired connection, communication channels 312-316 may be any type of wired connection that can facilitate electrical communication between activation element 302 and light module 304, timing element 308, and sound module 306. For a wireless connection, communication channels 312-316 may be any type of wireless connection that allows components to communicate and send or receive instructions. Non-limiting examples of ways components can connect wirelessly include WiFi, Bluetooth, radio frequency (RF), and ZigBee.

Light module 304 communicates with activation element 302 via communication channel 312, with timing element 308 via communication channel 318, with programming module 310 via communication channel 326, and with lighting elements 208 (not shown) via communication channel 328. Light module 304 may be any type of device that can receive an instruction from activation element 302, timing element 308, and programming module 310 and perform an action based on the instruction. Actions lighting module 304 may perform based on the instructions received include turning on lighting elements 208, turning off lighting elements 208, and changing the color of the lighting elements 208. As described above, communication channels 312, 318, 326, and 328 may be wired or wireless connections. As a non-limiting example, in the case of communication channel 328, a wired communication channel 328 may correspond to lighting element wires 206.

Sound module 306 communicates with activation element 302 via communication channel 316, with timing element 308 via communication channel 320, and with programming module 310 via communication channel 322. Sound module 306 may be any type of device that can receive an instruction from activation element 302, timing element 308, and programming module 310 and perform an action based on the instruction. Actions sound module 306 may perform based on the instructions received include turning on sound, turning off sound, and changing the type of sound emission. As described above, communication channels 316, 320, and 322 may be wired or wireless connections.

Timing element 308 communicates with activation element 302 via communication channel 314, with light module 304 via communication channel 318, with sound module 306 via communication channel 320, and with programming module 310 via communication channel 324. Timing element 308 may be any type of device that can receive an instruction from activation element 302 and programming module 310 and perform an action based on the instruction. Actions timing element 308 may perform include sending instructions to turn off lighting elements 208 after a specified period of time and sending instructions to turn off sound emission after a specified period of time. As described above, communication channels 318, 320, and 324 may be wired or wireless connections.

Programming module 310 communicates with light module 304 via communication channel 326, with timing element 308 via communication channel 324, with sound module 306 via communication channel 322, and with a user via communication channel 332. Programming module may be any type of device that can receive instructions from a user and provide those instructions to light module 304, sound module 306, and timing element 308. Non-limiting examples of instructions programming module may provide include changing the type of sound emission, changing the color of lighting elements 208, and changing the amount of time light and sound are emitted. As described above, communication channels 324, 326, 322, and 332 may be wired or wireless connections.

A user may communicate with programming module 310 in any typical way in which a user interacts with a device. As a non-limiting example, a user may connect programming module 310 to an application on the user's mobile phone. By entering preferences via the mobile device, the user can control the lights, sound, and timing of light and sound emission. As another non-limiting example a user may connect programming module 310 to a computer, including a laptop, desktop, or tablet computer.

Power source 330 is in electrical communication with light module 304, sound module 306, timing element 308, and programming module 310. Power source 330 provides power for each component to operate. A non-limiting example of a power source is a button cell battery, but any type of power source that can provide adequate power is acceptable.

Figure 4:
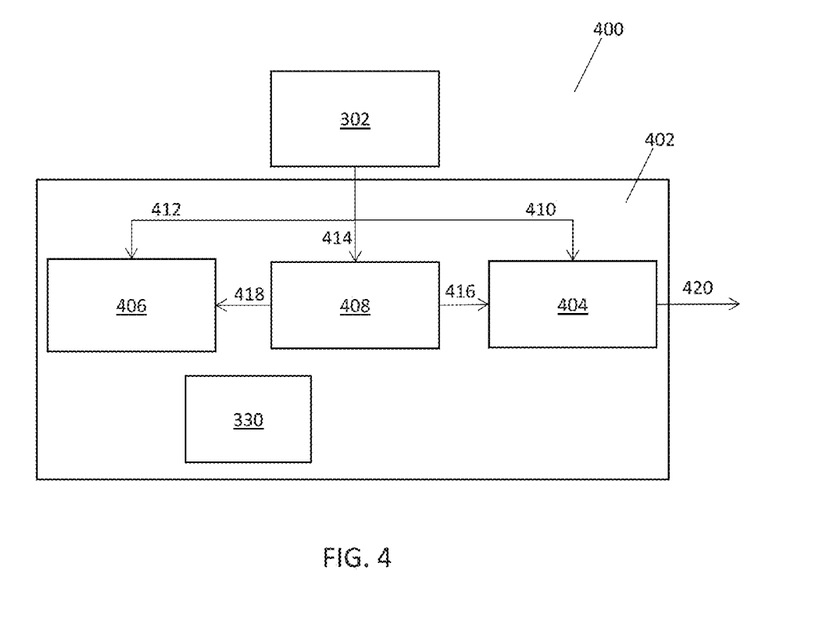
FIG. 4 illustrates a block diagram of an alternate embodiment of a control module in accordance with other aspects of the present invention.

FIG. 4 illustrates a block diagram of a control module in accordance with other aspects of the present invention.

As shown in the figure, a control system 400 includes activation element 302 and a control module 402. Control module 402 further includes a light module 404, a sound module 406, a timing element 408, and power source 330.

In this example embodiment, light module 404, sound module 406, timing element 408, and power source 330 are shown as independent components. However, in some embodiments, at least two of light module 404, sound module 406, tuning element 408, and power source 330 may be combined as a unitary device. Further, in some embodiments, at least one of light module 404, sound module 406, and timing element 408 may be implemented as a computer having tangible computer-readable media for carrying or having computer-executable instructions or data structures stored thereon. Such tangible computer-readable media can be any available media that can be accessed by a general purpose or special purpose computer. Non-limiting examples of tangible computer-readable media include physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Light module 404 communicates with activation element 302 via communication channel 410, with tuning element 408 via communication channel 416, and with lighting elements 208 (not shown) via communication channel 420. Sound module 406 communicates with activation element 302 via communication channel 412 and with timing element 408 via communication channel 418. Timing element 408 communicates with activation element 302 via communication channel 414, with light module 404 via communication channel 416, and with sound module 406 via communication channel 418.

Light module 404, sound module 406, and timing element 408 perform substantially the same functions as the light module 304, sound module 306, and timing element 308 from FIG. 3. However, because control module 402 does not include a programming module, a user does not have the option to change any settings. In this example embodiment, light module 404 is preprogrammed to provide a certain color light or certain combinations of lights, sound module 406 is preprogrammed to provide a certain sound or combination of sounds, and timing element 408 is preprogrammed to allow light module 404 and sound module 406 to operate for a specific amount of time before turning off. Preprogramming is provided by the manufacturer.

In some embodiments, light module 404 will be programmed to provide a single display of lights every time light module 404 is activated. In other embodiments, light module 404 will be programmed to provide a plurality of lighting displays, and each time light module 404 is activated a different lighting display will appear. After the last of the preprogrammed lighting displays is shown, the cycle will start over with the first lighting display.

In some embodiments, sound module 406 will be programmed to provide a single sound or song every time sound module 406 is activated. In other embodiments, sound module 406 will be programmed to provide a plurality of sounds or songs, and each time sound module 406 is activated a different sound or song will play. After the last of the preprogrammed sounds or songs is played, the cycle will start over with the first sound or song.

In some embodiments, timing element 408 will be programmed to send signals to turn off light module 404 and sound module 406 after a certain period of time. In other embodiments, timing element 408 may be programmed to provide a group of different time periods before sending signals to turn off light module 404 and sound module 406. As a non-limiting example, the first time light and sound is emitted, timing element 408 may send a signal to turn off the light and sound after thirty seconds, the second time after forty seconds, and the third time after fifty seconds. The fourth time light and sound is emitted, timing element 408 may begin the cycle again and send a signal to turn off the light and sound after thirty seconds.

As described above, communication channels 410-420 may be wired or wireless.

FIG. 5 illustrates an exploded view of a panel of a novelty bag in accordance with aspects of the present invention.

As shown in the figure, front panel 102 includes an outer panel 502 and an inner panel 504. Inner panel 504 further includes a pouch 506, and pouch 506 further includes slits 508.

Outer panel 502 may be constructed from any material typically used for fabricating bags on which novelty design 144 (not shown) can be printed. Non-limiting examples of materials that may be used include paper, fabric, polyethylene, polypropylene, and other plastic or woven materials.

Inner panel 504 may be constructed from any material typically used for fabricating bags including, but not limited to, paper, fabric, polyethylene, polypropylene, and other plastic or woven materials. Inner panel 504 also includes a hole (not shown) through which lighting element wires 206 and an activation element wire 510 extend. Handle 112 also includes a hollow center cavity through which activation element wire 510 extends.

Pouch 506 is attached to, and extends from, inner panel 504. Pouch 506 may be constructed from any material that can be suitably attached to inner panel 504 such that pouch 506 can support control module 200. Pouch 506 is open at the top and is sized to receive control module 200. In alternate embodiments, pouch 506 may include a top flap that can be secured to pouch 506 to prevent control module 200 from falling out of pouch 506.

Figure 5B:
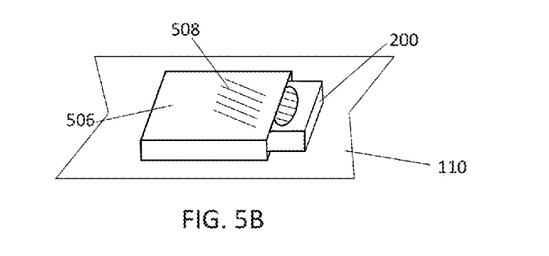
FIG. 5B illustrates a view of a bottom panel of a novelty bag in accordance with aspects of the present invention.

In an alternate embodiment, as shown in FIG. 5B, pouch 506 may be attached to bottom panel 110 instead of inner panel 504.

Slits 508 are openings within pouch 506 that match up with opening 204 of control module 200 such that sound emitted from control module 200 can travel through opening 204 and slits 508 and still be audible to anyone near the bag. Slits 508 may be long, straight cuts in pouch 506, as shown in FIG. 5, however slits 508 may also be small, circular holes, or any other type of opening in pouch 506 that allows sound to pass through.

In one embodiment, before assembling outer panel 502 and inner panel 504, control module 200 must be inserted into pouch 506. Lighting elements 208, lighting element wires 206, activation element 302, and activation element wire 510 must be placed through the hole in inner panel 504. Then, lighting elements 208 are connected to orifices 116-142. For purposes of explanation, only a few lighting elements 208 are shown, however it can be appreciated that the number of lighting elements 208 will match the number of orifices located in outer panel 502. Activation element wire 510 is placed through the channel in handle 112 and through orifice 146, is connected to activation element 302 via typical electrical connection means, and then activation element 302 is connected to orifice 146.

In an alternate embodiment, lighting elements 208 can be connected to orifices 116-142, and activation element 302 can be connected to orifice 146, then lighting element wires 208 and activation element wire 510 can be fed through the hole in inner panel 504. Lighting element wires 208 and activation element wire 510 can then be connected to control module 200 by any typical electrical connection means. Control module 200 can then be inserted into pouch 506.

In yet another alternate embodiment, lighting elements 208 and activation element 302 may be wirelessly connected to control module 200, thus eliminating lighting element wires 208 and activation element wire 510. In this case, the hole in inner panel 504 is unnecessary. Lighting elements 208 can be connected to orifices 116-142, activation element 302 can be connected to orifice 146, and control module 200 can be inserted into pouch 506.

After lighting elements 208, activation element 302, and control module 200 are in place, outer panel 502 and inner panel 504 can be connected. Outer panel and inner panel can be connected using any conventional connection methods to connect layers of a bag. Non-limiting examples of connection methods include stitching, adhesives, heat sealing, and tape.

In an alternate embodiment, if lighting element wires 208 and activation element wire 510 are fed through the hole in inner panel 504, outer panel 502 and inner panel 504 may be connected before attaching lighting element wires 208 and activation element wire 510 to control module 200. This method may provide for easier manufacturing.

Figure 6:
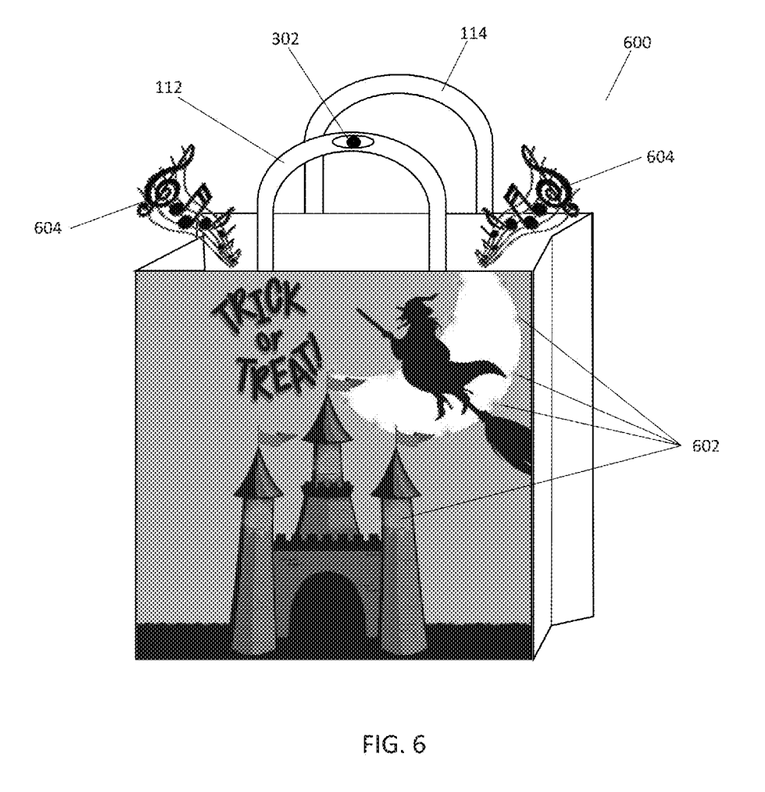
FIG. 6 illustrates a functioning novelty bag in accordance with aspects of the present invention.

FIG. 6 illustrates a functioning novelty bag in accordance with aspects of the present invention.

As shown in the figure, novelty bag 600 includes lights 602 and sound 604.

In operation, a child may be trick-or-treating on Halloween, and the child may be carrying novelty bag 600. The child may be holding handles 112 and 114 with one hand while he is walking to a house to ask for some candy. When the owner of the house opens the door, the child may press activation element 302, initiating the light and sound sequence.

In one embodiment, light module 304 is programmed to cause lights 602 to emit white light and sound module 306 is programmed to cause sound 604 to emit a recording of "trick or treat" for fifteen seconds after activation element 302 is pressed.

In another embodiment, light module 304 is programmed to cause lights 602 to emit a variety of colored lights and sound module 306 is programmed to cause sound 604 to emit a recording of the song "The Monster Mash" for twenty seconds after activation element 302 is pressed.

In yet another embodiment, before going trick-or-treating the child may have programmed control module 200 to execute different sequences of light and sound emission upon pressing activation element 302. For example, when the child presses activation element 302 the first time, light module 304 may cause lights 602 to emit flashing orange and white lights and sound module 306 may cause sound 604 to emit a scary laughing noise for ten seconds. When the child presses activation element 302 the second time, light module 304 may cause lights 602 to glow red and sound module 306 may cause sound 604 to emit "trick or treat" for fifteen seconds. When the child presses activation element 302 the third time, light module 304 may cause lights 602 to light up in sequence to look like the light is moving, and sound module 306 may cause sound 604 to emit the music from the movie "Halloween" for twenty seconds.

Not only do the light and sound emitted from novelty bag 600 provide entertainment for trick-or-treaters and those providing candy, but they also provide assurance that the child will be visible and audible to cars or other passersby. When walking in between houses, the child may choose to press activation element 302, and the subsequent light and sound emission will be visible and audible to notify others of the presence of the child when they otherwise may not have noticed the child's presence.

In yet other embodiments, novelty bag 600 may be used as a bag in which a birthday present is delivered. The novelty design on front panel 102 may include a birthday cake with candles. Upon pressing activation element 302, novelty bag 600 may cause light module 304 to turn on lights that make it look like the candles are lit, and sound module 306 may cause sound 604 to emit the song "Happy Birthday" for thirty seconds.

After the specified amount of time for light and sound emission, the light and sound emission are automatically turned off.

Embodiments of the present invention describe a novelty bag that can emit different types of light and sound for a specified amount of time. This can be useful during Halloween, for example, because it is fun for children to activate the light and sound, and because the light and sound keep children visible during twilight and evening trick-or-treating hours. It can also be useful in other situations, such as gift giving for birthdays or anniversaries, or any other time during which a novelty bag may be useful.

The foregoing description of various preferred embodiments have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A novelty bag, comprising:
   at least one panel connected to a bottom panel;
   at least one handle connected to the at least one panel;
   a pouch connected to the at least one panel;
   a light module disposed within the pouch;
   a sound module disposed within the pouch;
   at least one orifice in the at least one panel, the at least one orifice adapted to receive a lighting element; said light module electrically connected to said lighting element;
   at least one slit in the pouch, the slit adapted to allow sound to travel through the pouch; and
   an activation mechanism disposed within the at least one handle, the activation mechanism in electrical communication with the light module and the sound module.

2. The novelty bag of claim 1, further comprising a timing element disposed within the pouch.

3. The novelty bag of claim 2, wherein the light module, the sound module, and the timing element are a single control module.

4. The novelty bag of claim 3, wherein the activation mechanism is in electrical communication with the timing element.

5. The novelty bag of claim 4, wherein activating the activation mechanism causes the light module and the sound module to turn on.

6. The novelty bag of claim 5, wherein the timing element causes the light module and the sound module to turn off after a predetermined amount of time.

7. The novelty bag of claim 2, wherein the activation mechanism is in electrical communication with the timing element.

8. The novelty bag of claim 7, wherein activating the activation mechanism causes the light module and the sound module to turn on.

9. The novelty bag of claim 8, wherein the timing element causes the light module and the sound module to turn off after a predetermined amount of time.

10. A novelty bag, comprising:
    at least one panel connected to a bottom panel;
    at least one handle connected to the at least one panel;
    a pouch connected to the bottom panel;
    a light module disposed within the pouch;
    a sound module disposed within the pouch;
    at least one orifice in the at least one panel, the at least one orifice adapted to receive a lighting element; said light module electrically connected to said lighting element;
    at least one slit in the pouch, the slit adapted to allow sound to travel through the pouch; and
    an activation mechanism disposed within the at least one handle, the activation mechanism in electrical communication with the light module and the sound module.

11. The novelty bag of claim 10, further comprising a timing element disposed within the pouch.

12. The novelty bag of claim 11, wherein the light module, the sound module, and the timing element are a single control module.

13. The novelty bag of claim 12, wherein the activation mechanism is in electrical communication with the timing element.

14. The novelty bag of claim 13, wherein activating the activation mechanism causes the light module and the sound module to turn on.

15. The novelty bag of claim 14, wherein the timing element causes the light module and the sound module to turn off after a predetermined amount of time.

16. The novelty bag of claim 11, wherein the activation mechanism is in electrical communication with the timing element.

17. The novelty bag of claim 16, wherein activating the activation mechanism causes the light module and the sound module to turn on.

18. The novelty bag of claim 17, wherein the timing element causes the light module and the sound module to turn off after a predetermined amount of time.

* * * * *